O. R. L. & M. P. A. CROZIER.
Plant-Protector.
No. 38,656.
Patented May 26, 1863
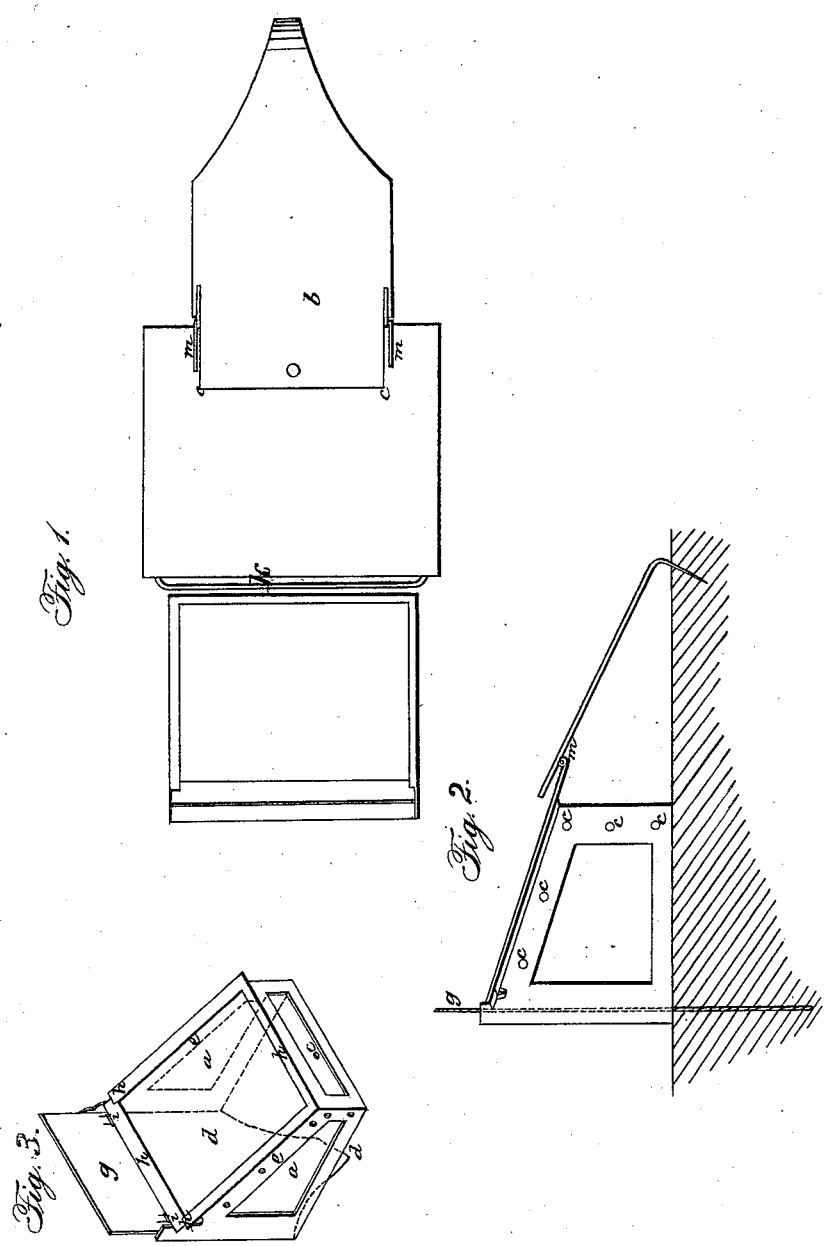
Witnesses:
Inventor:

United States Patent Office.

OWEN R. L. CROZIER AND M. P. A. CROZIER, OF PARIS, MICHIGAN.

IMPROVEMENT IN HAND-LIGHTS FOR PROTECTING PLANTS.

Specification forming part of Letters Patent No. 38,656, dated May 26, 1863; antedated October 12, 1862.

*To all whom it may concern:*

Be it known that we, OWEN R. L. CROZIER and M. P. A. CROZIER, of Paris, in the county of Kent and State of Michigan, have invented certain new and useful Improvements in Hand-Lights for Protecting Plants from Frost; and we hereby declare that the following is a true and exact description of the same, reference being had to the accompanying drawings, and to the letters of reference marked thereon.

The object of our invention is to furnish a cheap and convenient implement for protecting plants from frost and chilling winds in early spring, and thus enabling the horticulturist to anticipate the genial warmth of summer in the cultivation of his choice vegetables.

Figure 3, in the annexed drawings, which make a part of this specification, gives a perspective view of the body of our hand-light, the frame of which may be made of any light wood.

The letters $a\ a\ a$ represent the panes of glass let into the sides and front of the frame for the admission of light. The sides $e\ e$, near the upper edge and also at the ends, are perforated with holes, so as to admit of a free circulation of air in the interior of the frame. The letter $d$ designates the cover, and consists of a pane of glass inserted in the sash $h\ h\ h\ h$, a plan view of which is represented by Fig. 1. The cover at the points I I is furnished with hooks which fit into corresponding eyes in the stake. By this arrangement the cover can be elevated at any angle or entirely removed.

L is the point of the stake, designed to penetrate into the earth and hold the frame in a firm position when covering the plants.

Fig. 5 is a plan view of the leaf or instrument used as an additional protection of the plants from frost and cold. To effect this it can be removed from the back of the stake, to which it is attached by the loop $k$, and laid flat on the cover $d$. The leaf, being hinged at the points $m\ m$, and having the part marked $b$ curved and pointed at the lower end, can be forced into the earth, and thus retained in position.

The wooden frame-work of our hand-light is painted on the outside of a dark color to absorb the heat, and white in the interior to reflect it.

Having thus fully described our invention, what we claim, and desire to secure by Letters Patent, is—

1. The ventilation of our hand-lights without exposing the plants.
2. The attachment of the cover so that it may be opened and closed with facility.
3. The coloring of the exterior and interior surfaces so that the former shall absorb and the latter reflect heat.
4. The construction of an instrument as a complement of the hand-light, and to be set by plants to guard them from sun, cold winds, and frosts, all in the manner and for the purpose herein specified, or any other substantially the same.

OWEN R. L. CROZIER.
MARIA P. A. CROZIER.

Witnesses:
HIRAM H. ALLEN,
GEO. STABLER.